United States Patent [19]
Fukamoto et al.

[11] Patent Number: 5,436,065
[45] Date of Patent: Jul. 25, 1995

[54] STRIP OF WEBBING FOR SEAT BELTS IMPREGNATED AND COATED WITH AN ACRYLIC RESIN AND SILICONE MIXTURE

[75] Inventors: Masahiro Fukamoto, Kariya; Koichi Shimizu, Aichi; Koki Sato, Aichi; Masahiro Tanabe, Aichi, all of Japan

[73] Assignees: Toyoda Boshoku Corporation, Kariya; Kabushiki Kaisha Tokai Rika Denki Seisakusho, Aichi, both of Japan

[21] Appl. No.: 30,935

[22] Filed: May 14, 1993

[30] Foreign Application Priority Data

May 14, 1992 [JP] Japan ................................ 4-122021

[51] Int. Cl.⁶ .......................... B32B 7/00; D03D 3/00; B60R 22/00
[52] U.S. Cl. ............................ 428/257; 428/245; 428/266; 428/272; 280/808
[58] Field of Search ............... 428/245, 260, 262, 265, 428/266, 267, 257, 272; 280/808

[56] References Cited

U.S. PATENT DOCUMENTS

| | | | |
|---|---|---|---|
| 4,900,625 | 2/1990 | Kondo et al. | 428/383 |
| 5,154,966 | 10/1992 | Tohyama et al. | 428/241 |

*Primary Examiner*—James D. Withers
*Attorney, Agent, or Firm*—Oblon, Spivak, McClelland, Maier, & Neustadt

[57] ABSTRACT

A strip of webbing for seat belts includes webbing woven from multi-filament threads made from synthetic fiber, and a mixture of acrylic resin and silicone impregnated into and fixed on the surface of the webbing. The webbing is deteriorated less in the anti-wear property and the smoothness because the acrylic resin is dissociated less by light so that it can hold the silicone on the surface of the webbing for a longer period of time. Thus, the webbing can produce a seat belt exhibiting an excellent accommodatability.

13 Claims, 2 Drawing Sheets

STRIP OF WEBBING FOR SEAT BELTS IMPREGNATED AND COATED WITH AN ACRYLIC RESIN AND SILICONE MIXTURE

BACKGROUND OF THE INVENTION

1. Field of the Invention

The present invention relates to a strip of webbing which is employed in seat belts for vehicle, aircraft, or the like.

2. Description of the Related Art

Figure 1:
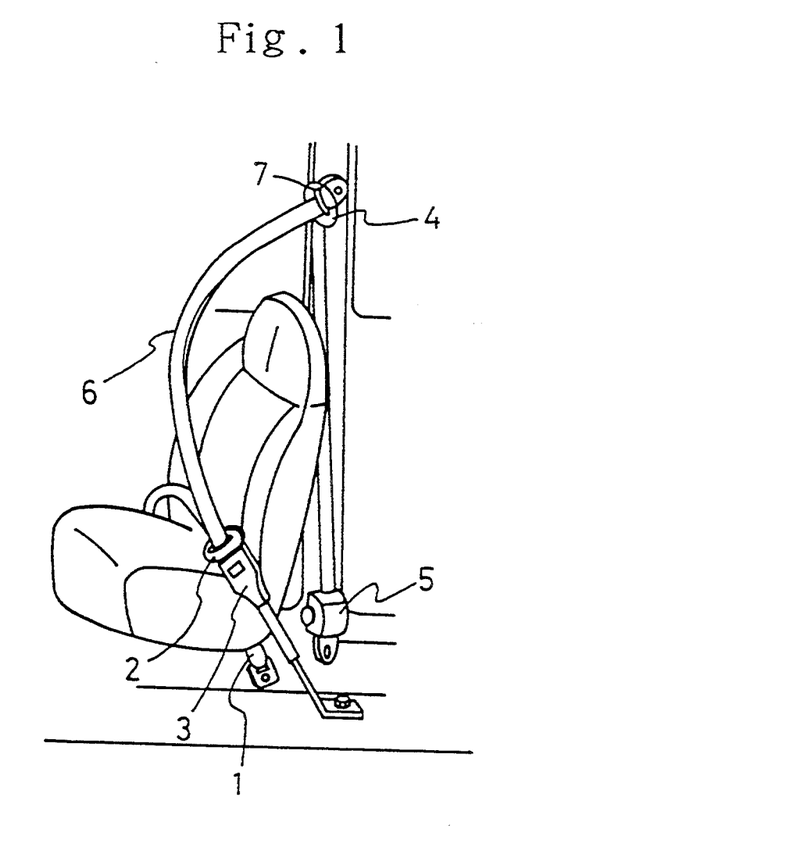
FIG. 1 is a schematic illustration for explaining a fastened seat belt.

A 3-point seat belt has been widely used in conventional vehicles. As illustrated in FIG. 1, in the 3-point seat belt, a strip of webbing 6 is fixed at 3 points, e.g., at a fixture 1, at a buckle 3 connected with a slipping guide 2 into which the webbing 6 is inserted, and at an upper slipping guide 4, in order to support the body of a passenger seated thereon.

When the 3-point seat belt is unfastened, a force is always exerted to the webbing 6 by a retractor 5 in a direction of taking up the webbing 6 in order to remove the looseness therein. Hence, when the slipping guide 2 into which the webbing 6 is inserted, and the buckle 3 are disengaged, the webbing 6 is taken up and accommodated in the retractor 5 until it exhibits no excessive looseness. On the other hand, when the 3-point seat belt is fastened, the webbing 6 is taken out by a necessary length by exerting an opposing force against the taking up force associated with the retractor 5.

Thus, every time the 3-point seat belt is fastened or unfastened, the webbing 6 is taken out and taken up repeatedly. Accordingly, the through hole 7 of the upper slipping guide 4 and the surface of the webbing 6 are rubbed each other with a high frequency.

Conventionally, a mixture of polyurethane resin and silicone is adhered to the surface of the webbing 6 so as to reduce the wear which results from the rubbing against the through hole 7 of the upper slipping guide 4. Namely, the mixture is adhered to the webbing 6 in order to enhance the smoothness of the webbing 6 (i.e., the accommodatability of the webbing 6), and at the same time to prevent the webbing 6 from wearing.

In general, it has been a well known technique that the silicone, or the like, is coated on cloth in order to improve the smoothness. However, the webbing 6 for the seat belts is made from multi-filament threads, and the multi-filament threads are made from synthetic fiber which have a smooth surface. Accordingly, it is hard to adhere and keep the silicone itself on the surface of the webbing 6. Hence, the polyurethane resin which exhibits an adhesive property to the webbing 6 and an anti-wear property is mixed with the silicone, thereby adhering the silicone on the surface of the webbing 6.

Although the mixture of the polyurethane resin and the silicone is good in the anti-wear property, it is insufficient in the light resistance. Namely, when the mixture is exposed to light for a long period of time, it undergoes the photodissociation and thereby it is more likely to come off from the surface of the webbing 6. Specifically speaking, the more the accumulated time of the exposition of the webbing 6 to the solar light is, namely the longer the webbing 6 is irradiated by the solar light, the more the polyurethane resin, holding the silicone on the surface of the webbing 6, is likely to be degraded and dissociated by the solar light. Accordingly, the polyurethane resin can scarcely hold the silicone thereon, and the silicone comes off from the surface of the webbing 6 gradually. As a result, the smoothness of the webbing 6 is reduced, and the anti-wear property is also deteriorated.

When the smoothness of the webbing 6 is lost, the resistance is increased during the retraction of the webbing 6 into the retractor 5. Consequently, it takes longer to take up the webbing 6 by the same length, and it also requires to exert a lager force while pulling out the webbing 6. Thus, there might arise a fear that the seat belt cannot be fastened or unfastened smoothly.

SUMMARY OF THE INVENTION

The present invention has been developed in view of the aforementioned circumstances of the conventional webbing for seat belts. It is therefore a primary object of the present invention to maintain the smoothness of a strip of webbing for a long period of time and to prevent the accommodatability thereof from deteriorating.

The primary object can be accomplished by a strip of webbing for seat belts according to the present invention, the webbing comprising:

webbing woven from multi-filament threads made from synthetic fiber; and a mixture of acrylic resin and silicone impregnated into and fixed on the surface of the webbing.

The present webbing for seat belts is formed by weaving the multi-filament threads made from synthetic fiber such as polyester, nylon, or the like. The woven structure of the webbing can be twill weave, herringvone twill weave, plain weave, etc., with "2-up and 2-down" or "3-up and 3-down" weaving. The numbers of the woven multi-filament threads can be, for instance, $300+/-50$ threads/50 mm for the warp and $20+/-2$ threads/inch for the weft, respectively. Thus, the webbing is a fabric in which the number of threads for the warp is considerably greater than the number of threads for the weft.

In order to maintain the smoothness on the surface of the present webbing, the mixture of acrylic resin exhibiting good light resistance and silicone is impregnated into and fixed on the surface of the webbing. With the mixture adhered on the surface, the silicone can be prevented from coming off from the surface of the webbing even when the webbing is exposed to light for a long period of time. As a result, the webbing maintains the smoothness associated with the silicone, and accordingly it is less likely to deteriorate in the accommodatability and to wear out.

The acrylic resin employed by the present webbing can be an acrylic resin copolymer which includes acrylic acid ester or methacrylic acid ester as the major components. It is preferred that the acrylic resin copolymer can be formed by polymerizing the following monomers: acrylic acid ester or methacrylic acid ester of a higher alcohol having carbon atoms in a quantity of 10 or more for effectively giving the webbing smoothness; acrylonitrile or methacrylonitrile for giving the webbing an anti-solvent property; acrylic acid, methacrylic acid, maleic acid, itaconic acid, hydroxyethyl or hydroxypropyl acrylic acid ester including a hydroxyl group, or hydroxyethyl or hydroxypropyl methacrylic acid ester including a hydroxyl group for giving the acrylic resin adhesion to the webbing; a monomer including a bridging functional group for improving the anti-solvent property of the acrylic resin; and acrylic acid ester or methacrylic acid ester of a lower alcohol having carbon atoms in a quantity of from 1 to 4 for forming an acrylic resin film.

The higher alcohol constituting the acrylic acid ester or methacrylic acid ester of a higher alcohol having carbon atoms in a quantity of 10 or more can be decyl alcohol (1-decanol, $C_{10}H_{21}OH$), isodecyl alcohol ($C_{10}H_{21}OH$), lauryl alcohol (n-dodecanol, $CH_3(CH_2)_{11}OH$), myristyl alcohol (1-tetradecanol, $C_{14}H_{29}OH$), cetyl alcohol (1-hexadecanol, $C_{16}H_{33}OH$), oleyl alcohol (octadecenol, $C_{18}H_{35}OH$), stearyl alcohol (1-octadecanol, $CH_3(CH_2)_{16}CH_2OH$)), ceryl alcohol (1-hexacosanol, $C_{26}H_{53}OH$), or the like.

The monomer including a bridging functional group can be at least one of N-methylol acrylamide, N, N'-dimethyl acrylamide, N-methoxy acrylamide, N-ethoxy acrylamide, N-butoxy acrylamide, and the like, or the mixtures thereof.

The lower alcohol constituting the acrylic acid ester or methacrylic acid ester of a lower alcohol having carbon atoms in a quantity of from 1 to 4 can be methyl alcohol, ethyl alcohol, propyl alcohol, isopropyl alcohol, butyl alcohol, isobutyl alcohol, or the like.

Preferably, the acrylic resin employed by the present webbing can be an acrylic resin copolymer which are formed by polymerizing the following monomer mixture in the following amount with respect to the whole monomer mixture taken as 100 parts by weight: the acrylic acid ester or methacrylic acid ester of the higher alcohol in an amount of from 20 to 50 parts by weight; the acrylonitrile or methacrylonitrile in an amount of from 10 to 20 parts by weight; the acrylic acid, methacrylic acid, maleic acid, itaconic acid, hydroxyethyl or hydroxypropyl acrylic acid ester including a hydroxyl group, or hydroxyethyl or hydroxypropyl methacrylic acid ester including a hydroxyl group in an amount of less than 10 parts by weight; the monomer including a bridging functional group in an amount of less than 10 parts by weight; and the acrylic acid ester or methacrylic acid ester of the lower alcohol in an amount of from 20 to 68 parts by weight. In addition, the sum of the acrylic acid, methacrylic acid, maleic acid, itaconic acid, hydroxyethyl or hydroxypropyl acrylic acid ester including a hydroxyl group, or hydroxyethyl or hydroxypropyl methacrylic acid ester including a hydroxyl group, and the monomer including a bridging functional group can preferably fall in a range of from 2 to 10 parts by weight.

Further, it is preferred that the monomer mixture for acrylic resin copolymer can further include a polymerizable alpha-beta ethylic unsaturated monomer, such as stylene, vinyl acetate, vinylidene chloride, or the like, in a trace amount of from 5 to 10 parts by weight, and that the resulting monomer mixture can be polymerized to use. The polymerizable alpha-beta ethylic unsaturated monomer is included in order to fireproof the webbing. However, when the polymerizable alpha-beta ethylic unsaturated monomer is included too much, the resulting acrylic resin is deteriorated in the adhesion to the webbing and in the light resistance.

Furthermore, it is preferred that the acrylic resin copolymer can further include alkyl polysiloxane having an epoxy group in the molecule in an amount of from 5 to 20 parts by weight with respect to the acrylic resin copolymer taken as 100 parts by weight in order to sustain the smoothness of the resulting acrylic resin film, and in order to enhance the compatibility of the acrylic resin copolymer with respect to the silicone to be added later. The epoxy group of the alkyl polysiloxane binds to the acid groups of the monomers contained in the acrylic resin copolymer so as to enhance the compatibility between the acrylic resin copolymer and the silicone to be added later, and accordingly the holdability of the silicone can be improved on the surface of the present webbing.

For instance, the alkyl polysiloxane can be expressed by the following general chemical formula:

where "R" is an alkyl group having carbon atoms in a quantity of from 1 to 4, "X" and "Y" are an integer of from 1 to 6, and "A" is an alkyl group including an epoxy group, e.g., 3, 4-epoxy cyclohexyl group.

In particular, the acrylic resin copolymer can include 3, 4-epoxy cyclohexyl dimethyl polysiloxane as the alkyl polysiloxane, thereby enhancing the compatibility of the acrylic resin copolymer with respect to the silicone to be added later. As a result, the present webbing can sustain the smoothness and the anti-wear property.

It is preferred that the silicone to be mixed and used with the acrylic resin can be a polymer of dimethyl silicone having a weight average molecular weight of from 100,000 to 2,000,000. When the weight average molecular weight is less than 100,000, no sufficient smoothness can be given to the resulting webbing. When the weight average molecular weight is more than 2,000,000, the silicone itself is unstable and it is more likely to degrade as time elapses.

In the present webbing, the mixture of the acrylic resin and the silicone can be impregnated into the webbing by immersing the webbing into a liquid, for instance, an emulsion, a suspension, or the like, containing the mixture. It is preferred that the liquid includes the acrylic resin in an amount of from 3.0 to 15.0% by weight as a solid content, and the silicone in an amount of from 1.0 to 10.0% by weight as a solid content.

When the liquid includes the acrylic resin in an amount of less than 3.0% by weight as a solid content, the silicone adheres to the resulting webbing so insufficiently that it comes off from the surface of the webbing. As a result, the resulting webbing unpreferably exhibits a deteriorated accommodatability. On the other hand, when the liquid includes the acrylic resin in an amount of more than 15.0% by weight as a solid content, the solidified acrylic resin content after drying increases so excessively that the resulting webbing hardens. As a result, the resulting webbing unpreferably deteriorates the fastenability of the seat belt.

When the liquid includes the silicone in an amount of less than 1.0% by weight as a solid content, the silicone content itself is so small unpreferably that the smoothness of the resulting webbing cannot be improved sufficiently. On the other hand, when the liquid includes the silicone in an amount of more than 10.0% by weight as a solid content, the silicone inhibits the acrylic resin from adhering to the webbing, thereby unpreferably causing a fear that the acrylic resin comes off from the surface of the resulting webbing.

When impregnating the liquid including the mixture of the acrylic resin and the silicone as the solid contents into the webbing, it is preferred to add a surface-active agent to the liquid. If such is the case, the mixtures impregnates well into the fine textures of the webbing, and accordingly the mixture can preferably adhere to the surface of the webbing with an enhanced adhesion force.

The surface-active agent added to the liquid including the mixture of the acrylic resin and the silicone as the solid contents can be, for example, a nonionic surface-active agent like polyethylene oxide, or an anionic surface-active agent. It is preferred to add the surface-active agent to the liquid in an amount of from 0.1 to 1.5% by weight. When the surface-active agent is added to the liquid in an amount of less than 0.1% by weight, the force resulting from the surface-active agent and adhering the acrylic resin and the silicone to the surface of the webbing is so small that the resulting webbing unpreferably exhibits a deteriorated anti-wear property. On the other hand, when the surface-active agent is added to the liquid in an amount of more than 1.5% by weight, the resulting webbing unpreferably hardens.

The acrylic resin is said to exhibit an anti-wear property being inferior to that of the polyurethane resin, but it exhibits a light resistance being superior to that of the polyurethane resin. Namely, the acrylic resin can hold the silicone on the surface of the webbing longer than the polyurethane resin does, and consequently it improves the anti-wear property of the present webbing. Here, when the surface-active agent added to the liquid including the mixture of the acrylic resin and the silicone as the solid contents, the mixture is enhanced in the impregnatability into the webbing, and accordingly the addition of the surface-active agent improves the anti-wear property of the present webbing.

The present webbing includes the mixture of the acrylic resin and the silicone impregnated into and fixed on the surface. Since the acrylic resin holding the silicone on the surface of the present webbing is dissociated less by light than the polyurethane resin is, it can hold the silicone on the surface of the webbing for a longer period of time. Accordingly, the present webbing is deteriorated less in the anti-wear property and the smoothness. Therefore, the present webbing can produce a seat belt which exhibits an excellent accommodatability.

As having been described so far, in the present webbing, the acrylic resin having the light resistance is impregnated into and fixed on the surface of the present webbing together with the silicone. Since the acrylic resin film holding the silicone is inhibited from being dissociated by light, the silicone molecules are prevented from separating or coming off. As a result, the present webbing can sustain the initial accommodatability of a seat belt for a longer period of time. Although the acrylic resin is said to exhibit an anti-wear property being inferior to that of the polyurethane resin, it exhibits such a good light resistance that it can hold the silicone on the surface of the webbing satisfactorily. As a result, the acrylic resin can give the present webbing an anti-wear property which is at a level being substantially equivalent to the anti-wear property given by the polyurethane resin.

In addition, the color tone or the color intensity of a strip of webbing is dependent on the color of light which is reflected from the surface thereof and observed through a resin film coating thereon. When the resin film is deteriorated, a part of the resin film is exfoliated, or the resin film is colored. The exfoliation, the coloring, or the like, of the resin film results in the discoloration, the blurry color, or the like. However, the present webbing includes the acrylic resin which exhibits the improved light resistance and makes a resin film less likely to deteriorate. Therefore, the present webbing is inhibited from suffering from the drawbacks like the discoloration, the blurry color, etc.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

The First Preferred Embodiment of the present webbing was prepared as follows.

Acrylic Resin Preparation Process

First of all, an acrylic resin monomer mixture was prepared, and it included the following monomers in the following amounts:

40 parts by weight of lauryl methacrylate;
20 parts by weight of acrylonitrile;
4 parts by weight of methylol acrylamide;
2 parts by weight of itaconic acid; and
34 parts by weight of ethyl acrylate.

The monomer mixture was dissolved into toluene, and 2,2'-azobisisobutyronitrile was added thereto as an initiator. The monomer mixture was processed by solution polymerization.

Then, 10 parts by weight of 3,4-epoxy cyclohexyl dimethyl polysiloxane illustrated by the aforementioned general chemical formula, 5 parts by weight of a nonionic surface-active agent exhibiting an HLB (i.e., Hydrophile Lipophile Balance) of 12 or less, and water were added to the resulting acrylic resin solution. Here, the solid content of the resulting acrylic resin solution was taken as 100 parts by weight. Thereafter, the resulting mixed solution was processed by reduced-pressure distillation, thereby removing and replacing the organic solvent (i.e., toluene) with the aqueous solvent (i.e., water). When 70% of the toluene was replaced with water, 5 parts by weight of another nonionic surface-active agent exhibiting an HLB of 15 or more was added to the residual mixed solution so as to obtain a stable acrylic resin emulsion for the First Preferred Embodiment (hereinafter referred to as a "first acrylic resin emulsion") in an aqueous medium.

The alkyl polysiloxane including an epoxy group, e.g., 3,4-epoxy cyclohexyl dimethyl polysiloxane, can be dissolved into an organic solvent such as toluene, xylene, or the like, in advance, and the aforementioned acrylic resin monomer mixture can be added to the resulting solution together with an initiator. Then, the acrylic resin monomer mixture can be polymerized in the solution. After completing the polymerization, the nonionic surface-active agent exhibiting an HLB of 12 or less, and water can be added to the resulting acrylic resin solution, and the mixed solution can be processed by reduced-pressure distillation in order remove and replace the organic solvent with the aqueous solvent.

The acrylic resin monomer mixture can be processed into a stable acrylic resin emulsion by ordinary emulsion polymerization. If such is the case, the acrylic resin monomer mixture can be processed by emulsion polymerization in the presence of the alkyl polysiloxane including an epoxy group, or it can be mixed with the alkyl polysiloxane after the polymerization.

Hereinafter, the First Preferred Embodiment of the present webbing will be described along with a webbing manufacturing process.

(1) Weaving Process

Multi-filament threads made from polyester, including 108 filaments per a thread and exhibiting 1,260 denier were prepared for the warp. Multi-filament threads made from polyester, including 96 filaments per a thread and exhibiting 500 denier were prepared for the weft. The warp and the weft were woven into the herringvone twill weave with "2-up and 2-down" weaving on a needle loom, thereby forming a strip of webbing as woven in 50 mm width and 1.2 mm thickness. In the webbing as woven, the number of the woven threads was 300+/−50 threads/50 mm for the warp and 20+/−2 threads/inch for the weft.

(2) Dyeing process

The webbing was dyed by dipping with an anthraquinone dispersing dye. The dye was coated on the webbing in an amount of 20+/−5% in o.w.f. Hereinafter, o.w.f. means a ratio of the weight of coated dye or resin to the weight of webbing, and it is calculated by the following equation:

$o.w.f. =$ {(Weight of Coated Substance on Unit Area of Substrate to be Coated)/(Unit Area Weight of Substrate to be Coated)} $\times$ 100.

(3) Drying Process

The webbing with the dye coated was transferred through a far infrared high temperature oven for 3 minutes. Thereafter, the dye was fixed on the webbing by thermo-sol process.

(4) Washing Process

The webbing with the dye fixed was washed by reduction washing process.

(5) Acrylic Resin-Silicone Mixture Coating Process 45 grams of the aforementioned first acrylic resin emulsion whose solid content was 45% by weight was mixed with 45 grams of a dimethyl silicone polymer whose solid content was 30% by weight and 5 grams of an anionic surface-active agent. The mixture was diluted with 1 liter of water, thereby preparing an acrylic resin-silicone mixed solution. The washed webbing was immersed into the acrylic resin-silicone mixed solution, and thereby the resins were impregnated into and fixed on the surface of the webbing. The acrylic resin-silicone mixed solution was coated on the webbing in an amount of 20+/−5% in o.w.f.

(6) Drying Process

The webbing with the acrylic resin-silicone mixed solution coated was dried by transferring it through a far infrared drier oven. Then, the coated resins were cured with a high temperature oven so as to form a film on the webbing.

The aforementioned processes (2) through (6) can be carried out continuously and simultaneously with a continuous dyeing machine.

Second Preferred Embodiment

A Second Preferred Embodiment of the present webbing was prepared as follows.

Acrylic Resin Preparation Process

An acrylic resin monomer mixture was prepared, and it included the following monomers in the following amounts:

20 parts by weight of stearyl methacrylate;
15 parts by weight of acrylonitrile;
5 parts by weight of hydroxyethyl methacrylate;
2 parts by weight of N-methylol acrylamide;
20 parts by weight of butyl acrylate; and
38 parts by weight of methyl acrylate.

The monomer mixture was processed by solution polymerization in a manner similar to the First Preferred Embodiment.

Then, 15 parts by weight of 3,4-epoxy cyclohexyl dimethyl polysiloxane added to the resulting acrylic resin solution whose solid content was taken as 100 parts by weight, and the mixture was processed into a stable acrylic resin emulsion for the Second Preferred Embodiment (hereinafter referred to as a "second acrylic resin emulsion") in a manner similar to the First Preferred Embodiment except that no surface-active agents were added.

Thereafter, Processes (1) through (6) described in the "First Preferred Embodiment" section were carried out in the same manner except that the second acrylic resin emulsion substituted for the first acrylic resin emulsion in Process (5), and that no surface-active agent was added therein. Thus, the solid contents of the resulting acrylic resin-silicone mixed solution were impregnated into and fixed on the surface of the webbing in Process (5), thereby preparing the Second Preferred Embodiment of the present webbing.

Comparative Example No. 1

The conventional webbing of Comparative Example No. 1 was prepared as follows.

A commercially available polyurethane resin was prepared, and it was processed into a stable polyurethane resin emulsion in a manner similar to the First Preferred Embodiment except that no surface-active agent was added.

Thereafter, Processes (1) through (6) described in the "First Preferred Embodiment" section were carried out in the same manner except that the stable polyurethane resin emulsion substituted for the first emulsion in Process (5), and that no surface-active agent was added therein. Thus, the solid contents of the resulting polyurethane resin-silicone mixed solution were impregnated into and fixed on the surface of the webbing in Process (5), thereby preparing the conventional webbing of Comparative Example No. 1.

Comparative Example No. 2

A strip of webbing of Comparative Example No. 2 was prepared as follows.

Namely, Processes (1) through (6) described in the "First Preferred Embodiment" section were carried out in the same manner except that the dimethyl silicone polymer and the surface-active agent were not added to the first acrylic resin emulsion in Process (5). Thus, the solid content of the first acrylic resin emulsion was impregnated into and fixed on the surface of the webbing in Process (5), thereby preparing the webbing of Comparative Example No. 2.

Evaluations

The strips of the webbing of the First and Second Preferred Embodiments and Comparative Example Nos. 1 and 2 were evaluated for the characteristics, e.g., the chloroform extraction rate, the discoloration due to light, the impregnatability, the bending resistance, and the anti-wear property. The results of the evaluations are set forth in Table 1 below and illustrated in the graphs of FIGS. 2 and 3.

TABLE 1

|  | 1st Pref. Embodiment | 2nd Pref. Embodiment | Comp. Ex. No. 1 | Comp. Ex. No. 2 |
| --- | --- | --- | --- | --- |
| Chloroform Extraction Rate after UV Irradiation |  |  |  |  |
| W/O Filter | 2.30 | — | 8.25 | — |
| With Filter | 1.01 | — | 3.35 | — |
| Discoloration due to Light ($\Delta E$) | 2.84 | — | 4.42 | — |
| Impregnatability ($\Delta E$) | 0.98 | 0.96 | 2.54 | 0.42 |
| Bending Resistance (gram) | 105 | 105 | 120 | 115 |
| Anti-wear Property | 85 | 82 | 85 | 78 |

Chloroform Extraction Rate

The chloroform extraction rate was evaluated in the following manner. The resin film of the webbing before being irradiated by ultraviolet rays and the resin film thereafter were washed with chloroform in order to extract low molecular weight molecules from the resin films. Then, the chloroform extraction rate, i.e., the destruction rate of bridging, was evaluated according the amounts of the low molecular weight molecules extracted.

Here, resin films were prepared by using the acrylic resin-silicone mixed solution for the webbing of the First Preferred Embodiment and the polyurethane resin-silicone mixed solution for the conventional webbing of Comparative Example No. 1. The resin films were irradiated by ultraviolet rays with a fade meter for a predetermined period of time. When irradiating the ultraviolet rays, half of the resin films were subjected to the ultraviolet rays directly, and the other half of the resin films were subjected to them by way of a soda-lime glass filter of 3 mm thickness. Thereafter, all of the resin films were washed with chloroform in order to extract the low molecular weight molecules contained therein. The results of this chloroform extraction rate evaluation are set forth in Table 1.

It has been known that the chloroform extraction rate relates to the photodissociation rate of the resin films. Namely, the larger chloroform extraction rate means that the resin films are decomposed more to the lower molecular weight molecules which are likely to be extracted by the solvent (i. e., chloroform).

It is appreciated from Table 1 that the resin films made from the acrylic resin-silicone mixed solution for the webbing of the First Preferred Embodiment and irradiated by the ultraviolet rays by way of the filter hardly underwent the photodissociation because the chloroform extraction rates were increased by a factor of 1.01 before and after being irradiated by the ultraviolet rays, and that the resin films formed on the webbing of the First Preferred Embodiment and subjected to the ultraviolet rays without the filter were degraded less by the ultraviolet rays because the chloroform extraction rates were increased by a factor of 2.3 before and after being irradiated by the ultraviolet rays.

On the other hand, the resin films made from the polyurethane resin-silicone mixed solution for the conventional webbing of Comparative Example No. 1 and irradiated by the ultraviolet rays by way of the filter exhibited the chloroform extraction rate of 3.35, about three times as much as the chloroform extraction rate exhibited by the resin films formed on the webbing of the First Preferred Embodiment. The resin films formed on the conventional webbing of Comparative Example No. 1 and subjected to the ultraviolet rays without the filter exhibited the chloroform extraction rate of 8.25, more than three times as much as the chloroform extraction rate exhibited by the resin films formed on the webbing of the First Preferred Embodiment. Hence, the resin films formed on the conventional webbing of Comparative Example No. 1 were more likely to be degraded by the irradiation of the ultraviolet rays.

Discoloration due to Light

The discoloration due to light was evaluated in accordance with Japanese Industrial Standard (hereinafter abbreviated to "JIS") Z 8730. Namely, the strips of the webbing of the First Preferred Embodiment and Comparative Example No. 1 were irradiated by light with a fade meter for a predetermined period of time, and the discolorations due to light were evaluated according to the color intensity difference ($\Delta E$) between the non-irradiated parts and the irradiated parts. The results of this discoloration evaluation are also set forth in Table 1.

As can be appreciated from Table 1, the discoloration arisen in the webbing of the First Preferred Embodiment was about a half of the discoloration arisen in the webbing of Comparative Example No. 1. The webbing of the First Preferred Embodiment thus exhibited a superb light resistance.

Impregnatability

The impregnatability was also evaluated in accordance with JIS Z 8730. Namely, the strips of the webbing of the First and Second Preferred Embodiments and Comparative Example Nos. 1 and 2 were evaluated for the color intensity difference ($\Delta E$) between the parts free from the acrylic resin-silicone mixture, the polyurethane resin-silicone mixture, the simple silicone or the simple acrylic resin, and the parts coated therewith. The results of this impregnatability evaluation are also set forth in Table 1.

Regarding the impregnatability, as set forth in Table 1, the strips of the webbing of the First and Second Preferred Embodiments exhibited the color intensity difference ($\Delta E$) of 0.98 and 0.96, respectively. The values were larger than the color difference ($\Delta E$) of 0.42 exhibited by that of Comparative Example No. 2 which was coated with the simple acrylic resin, but they were far less than the color difference ($\Delta E$) of 2.54 exhibited by that of Comparative Example No. 1 which were coated with the polyurethane resin-silicone mixture. Although the colors of the webbing of the First and Second Preferred Embodiments were varied more with respect to the webbing substrate than did the color of the webbing of Comparative Example No. 2, they were varied far less with respect thereto than did the color of the conventional webbing of Comparative Example No. 1.

Bending Resistance

The bending resistance was a rigidity of the finished strip of webbing after being coated with resin, and it was evaluated according to a bending resistance force which was exerted in the lengthwise direction of the webbing. The results of this bending resistance evaluation are also set forth in Table 1.

It is understood from Table 1 that the strips of the webbing of the First and Second Preferred Embodiments coated with the acrylic resin-silicone mixtures were softer than that of Comparative Example No. 1 coated with the polyurethane resin-silicone mixture, and they were also softer than that of Comparative Example No. 2 coated with the simple acrylic resin.

Anti-wear Property

The anti-wear property was a strength retention rate which was evaluated in accordance with JIS D 4604.

Regarding the anti-wear property, it is apparent from Table 1 that the webbing of the First Preferred Embodiment kept to exhibit the anti-wear property which was at the same level as that of the webbing of Comparative Example No. 1 coated with the polyurethane resin-silicone mixture. Although the webbing of the Second Preferred Embodiment which was coated with the acrylic resin-silicone mixture free from the surface-active agent exhibited a slight drop in the anti-wear property with respect to that of the webbing of the First Preferred Embodiment, the anti-property of the Second Preferred Embodiment can be regarded at the substantially same level as that of First Preferred Embodiment. On the other hand, the webbing of Comparative Example No. 2 which was coated with the simple acrylic resin free from the silicone exhibited the lowest anti-property because no smoothing effect to be given by the silicone can be expected therein.

When the surface-active agent was added to the acrylic resin-silicone mixture for the webbing of the First Preferred Embodiment, the acrylic resin was facilitated to impregnate into the multi-filament threads constituting the webbing. As a result, the adhesion between the acrylic resin and the webbing was enhanced so that the anti-wear property could be sustained.

The color of the webbing visually observed is the color which is reflected from the dye woven fabric and transmitted through the resin film coated thereon. The discoloration of the color is dependent on the blurrdeness which results from the come-off resin film caused by the photodissociation, the disappearance of the color uniformity caused by the color variation, or the like. Regarding the discoloration, the acrylic resins for the First and Second Preferred Embodiments had such a good light resistance that the discoloration was inhibited from occurring.

Accommodatability

Figure 2:
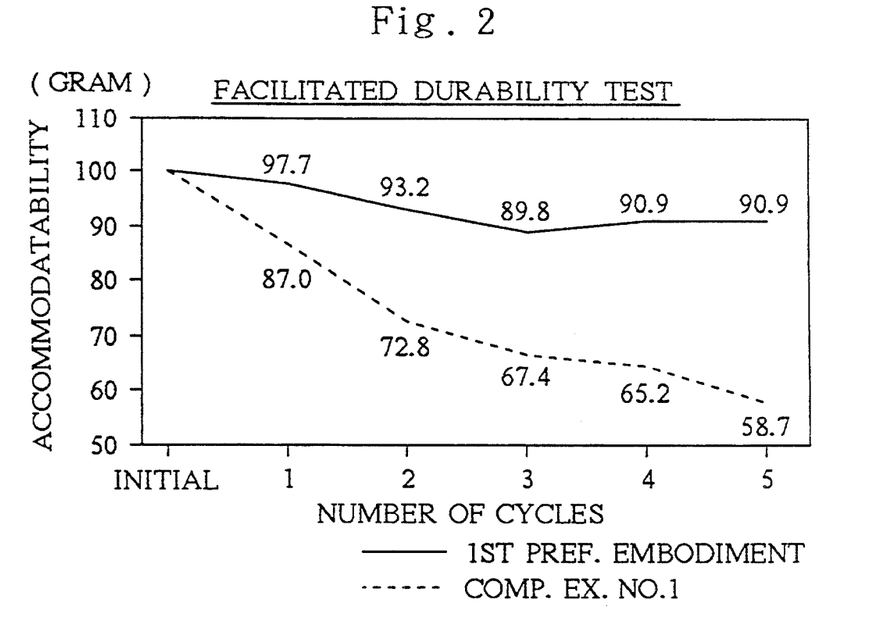
FIG. 2 is a line chart for illustrating the results of a facilitated durability test which evaluated the accommodatability degradation tendencies in a First Preferred Embodiment of a strip of webbing according to the present invention and a strip of conventional webbing of Comparative Example No. 1.

FIG. 2 is a line chart for illustrating the results of the facilitated durability test which evaluated the accommodatability degradation tendencies in the strips of the webbing of the First Preferred Embodiment and Comparative Example No. 1.

The facilitated durability test was adapted to evaluate a maximum load required for taking up a strip of webbing by a predetermined length in a predetermined time with the retractor. During the facilitated durability test, the webbing was connected with the retractor at an end, it was inserted into the slipping guide made from nylon which was fixed at a position away from the retractor, and it was subjected to a predetermined load at the opposite end with respect to the retractor. Further, in order to facilitatively examine the accommodatability degradation with the elapsed time, the webbing was irradiated by light with a fade meter for a predetermined time, it was blown by air mixed with a predetermined amount of dust, and then it was slid against the slipping guide for 1,000 times, thereby completing a cycle. The cycle was repeated for 5 times. The accommodatability, i.e., the maximum load, was measured every cycle. In FIG. 2, the axis of ordinate expresses the accommodatability, and the axis of abscissa expresses the number of the cycles. Thus, the accommodation degradation tendency with the increasing number of the cycles was evaluated.

As can be seen from FIG. 2, the webbing of the First Preferred Embodiment which was impregnated with the acrylic resin-silicone mixture kept to exhibit a maximum load of 90.9 gram even after the cycle was repeated for 5 times. On the other hand, the webbing of Comparative Example No. 1 which was impregnated with the polyurethane resin-silicone mixture exhibited a sharply reduced maximum load of 58.7 gram after the cycle was repeated for 5 times.

Light Resistance

Figure 3:
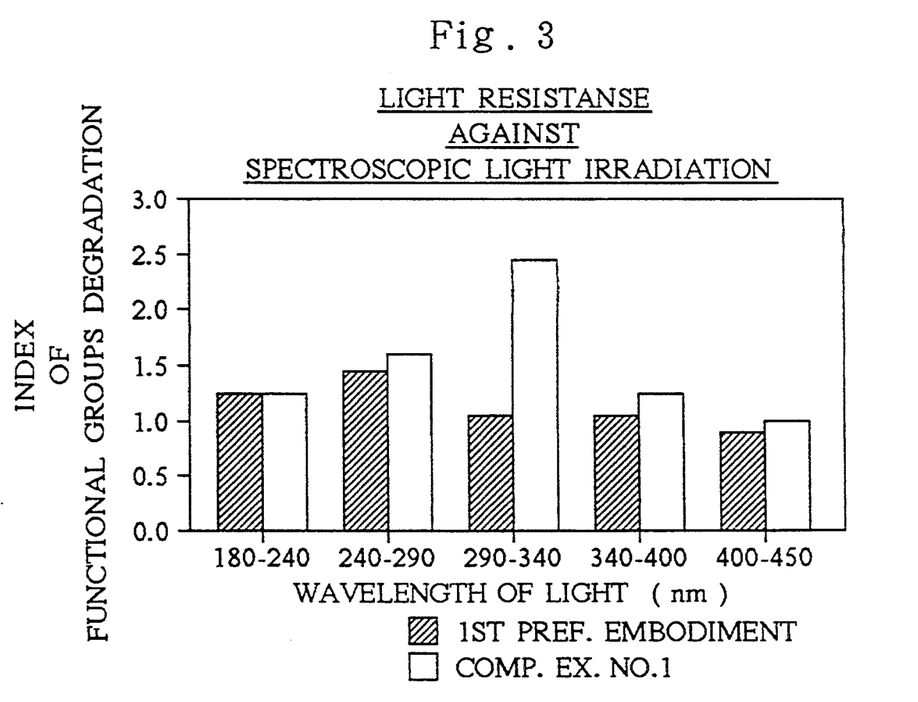
FIG. 3 is a column chart for illustrating the results of a light resistance test which evaluated how the acrylic resin for the First Preferred Embodiment of the present webbing and the polyurethane resin for the conventional webbing of Comparative Example No. 1 were deteriorated by light of predetermined wavelengths.

The acrylic resin for the webbing of the First Preferred Embodiment and the polyurethane resin for the webbing of Comparative Example No. 1 were examined for the light resistance. In the light resistance test, the acrylic resin and the polyurethane resin were irradiated by light of identified wavelengths, and thereafter they were analyzed by infrared spectroscopy. Thus, the degradations of the functional groups were evaluated according to the indexes which were calculated from the increment or decrement of the intensities of the peaks in the infrared spectra. FIG. 3 illustrates the results of the light resistance test.

The acrylic resin for the webbing of the First Preferred Embodiment was more stable against the light irradiation over the entire wavelength range of from 180 to 450 nm than was the polyurethane resin for the webbing of Comparative Example No. 1.

In particular, the polyurethane resin for the webbing of Comparative Example No. 1 was degraded considerably by the light whose wavelength fell in the range of from 290 to 340 nm. Unlike the ultraviolet rays, the light whose wavelength falls in the range of from 290 to 340 nm is not weakened by glass, or glass cannot provide a filtering effect to the light. To put it differently, the degradation of resin depends on the irradiation intensity in the wavelength range. Hence, the polyurethane resin is insufficient in the light resistance.

It is apparent from the foregoing descriptions that the light resistance as well as the anti-wear property of the present webbing are improved by impregnating the acrylic resin together with the silicone. These advantageous effects result from the operation of the acrylic resin. Namely, since the acrylic resin exhibits the high light resistance, it can hold the silicone so as to firmly adhere on the surface of the webbing. In addition, the acrylic resin can inhibit the color tone of the present webbing from varying, and it can also prevent the discoloration thereof from happening.

Having now fully described the present invention, it will be apparent to one of ordinary skill in the art that many changes and modifications can be made thereto without departing from the spirit or scope of the present invention as set forth herein including the appended claims.

What is claimed is:

1. A strip of webbing for seat belts, comprising:
   webbing woven from multi-filament threads made from synthetic fiber; and
   a mixture of acrylic resin and silicone impregnated into and fixed on the surface of said webbing by immersing said webbing into a liquid including said acrylic resin in an amount of from 3.0 to 15.0% by weight as a solid content, and said silicone in an amount of from 1.0 to 10.0% by weight as a solid content;
   wherein said acrylic resin is an acrylic resin copolymer formed by polymerizing a monomer mixture consisting, with respect to the whole monomer mixture taken as 100 parts by weight, essentially of:
   at least one first monomer selected from the group consisting of acrylic acid ester and methacrylic acid ester of a higher alcohol having carbon atoms in a quantity of 10 or more for effectively giving said webbing smoothness in an amount of from 20 to 50 parts by weight;
   at least one second monomer selected from the group consisting of acrylonitrile and methacrylonitrile for giving said webbing an anti-solvent property in an amount of from 10 to 20 parts by weight;
   at least one third monomer selected from the group consisting of acrylic acid, methacrylic acid, maleic acid, itaconic acid, hydroxyethyl acrylic acid ester including a hydroxyl group, hydroxypropyl acid ester including a hydroxyl group, hydroxyethyl methacrylic acid ester including a hydroxyl group and hydroxypropyl methacrylic acid ester including a hydroxyl group for giving said acrylic resin adhesion to said webbing in an amount of less than 10 parts by weight;
   a fourth monomer including a bridging functional group for improving an anti-solvent property of said acrylic resin in an amount of less than 10 parts by weight, said fourth monomer being at least one selected from the group consisting of N-methylol acrylamide, N,N'-dimethyl acrylamide, N-methoxy acrylamide, N-ethoxy acrylamide and N-butoxy acrylamide; and
   at least one firth monomer selected from the group consisting of acrylic acid ester and methacrylic acid ester of a lower alcohol having carbon atoms in a quantity of from 1 to 4 for forming an acrylic resin film in an amount of from 20 to 68 parts by weight.

2. The webbing according to claim 1, wherein the sum of said third monomer and said fourth monomer including a bridging functional group falls in a range of from 2 to 10 parts by weight with respect to the whole monomer mixture taken as 100 parts by weight.

3. The webbing according to claim 1, wherein said monomer mixture further includes a polymerizable alpha-beta ethylic unsaturated monomer in a trace amount of from 5 to 10 parts by weight.

4. The webbing according to claim 3, wherein said polymerizable alpha-beta ethylic unsaturated monomer is at least one selected from the group consisting of stylene, vinyl acetate, and vinylidene chloride.

5. The webbing according to claim 1, wherein said higher alcohol constituting said first monomer is at least one selected from the group consisting of decyl alcohol (1-decanol, $C_{10}H_{21}OH$), isodecyl alcohol ($C_{10}H_{21}OH$), lauryl alcohol (n-dodecanol, $CH_3(CH_2)_{11}OH$), myristyl alcohol (1-tetradecanol, $C_{14}H_{29}OH$), cetyl alcohol (1-hexadecanol, $C_{16}H_{33}OH$), oleyl alcohol (octadecenol, $C_{18}H_{35}OH$), stearyl alcohol (1-octadecanol, $CH_3(CH_2)_{16}Ch_2OH$)), and ceryl alcohol (1-hexacosanol, $C_{26}H_{53}OH$).

6. The webbing according to claim 1, wherein said lower alcohol constituting said fifth monomer is at least one selected from the group consisting of methyl alcohol, ethyl alcohol, propyl alcohol, isopropyl alcohol, butyl alcohol, and isobutyl alcohol.

7. The webbing according to claim 1, wherein said acrylic resin copolymer further includes an alkyl polysiloxane having an epoxy group in an amount of from 5 to 20 parts by weight with respect to said acrylic resin copolymer taken as 100 parts by weight.

8. The webbing according to claim 7, wherein said alkyl polysiloxane is expressed by the following general chemical formula:

where "R" is an alkyl group having carbon atoms in a quantity of from 1 to 4, "X" and "Y" are an integer of from 1 to 6, and "A" is an alkyl group including an epoxy group.

9. The webbing according to claim 1, wherein said silicone is a polymer of dimethyl silicone having a weight average molecular weight of from 100,000 to 2,000,000.

10. The webbing according to claim 1, wherein said liquid further includes at least one surface-active agent selected from the group consisting of a nonionic surface-active agent and an anionic surface-active agent in an amount of from 0.1 to 1.5% by weight.

11. The webbing according to claim 1, wherein said multi-filament threads are made from at least one fiber selected from the group consisting of polyester fiber and nylon fiber.

12. The webbing according to claim 1, wherein said webbing is woven into twill weave, herringbone twill weave or plain weave with "2-up and 2-down" or "3-up and 3-down" weaving.

13. The webbing according to claim 1, wherein the numbers of said woven multi-filament threads are 300+/−50 threads/50 mm for the wrap and 20+/−2 threads/inch for the weft, respectively.

* * * * *